April 22, 1930.  S. HUNT  1,755,956
CAM MECHANISM
Filed Jan. 3, 1928  2 Sheets-Sheet 1
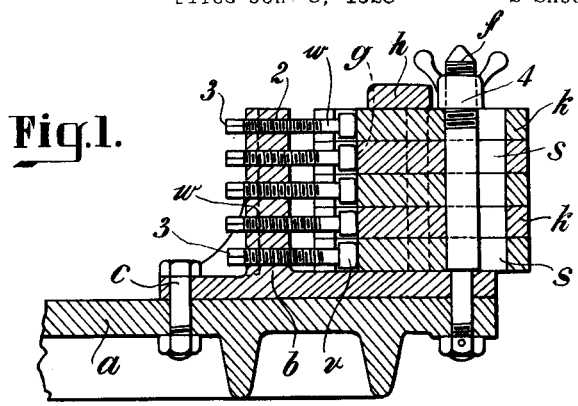
Fig. 1.
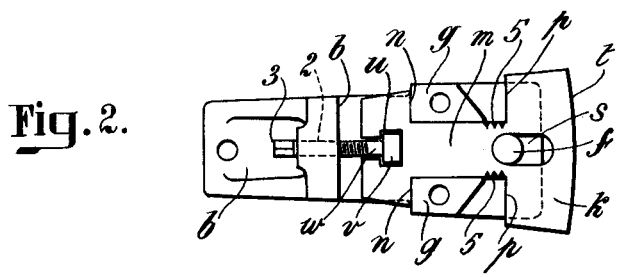
Fig. 2.
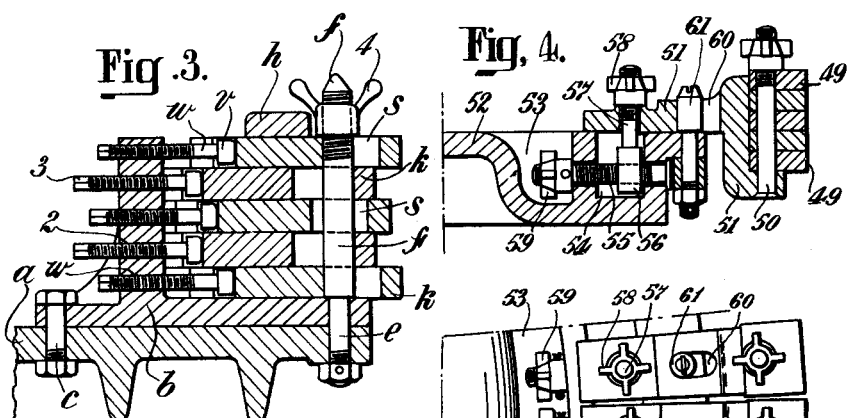
Fig. 3.  Fig. 4.
Fig. 5.
INVENTOR
SYDNEY HUNT,
His ATTORNEYS Patented Apr. 22, 1930

1,755,956

UNITED STATES PATENT OFFICE

SYDNEY HUNT, OF BIRMINGHAM, ENGLAND

CAM MECHANISM

Application filed January 3, 1928, Serial No. 244,356, and in Great Britain June 22, 1927.

This invention relates to machines for the manufacture of glass articles, such for instance as bottles, of the type including a plurality of units each adapted to form a glass article, and refers more particularly to that type of such machines in which stepped cams are provided and in which follower levers or their equivalent in connection with the units are so mounted and arranged that the follower, on any one of the units, controlling a part to be operated, such as a blowing valve, can be adjusted to co-operate with any one of the sets of the cam.

The invention is particularly suitable for application to bottle making machines of the type comprising a fixed column carrying the stepped cam or cams and a rotary framework provided with a plurality of bottle making units, for enabling the operation of blowing a bottle to be controlled in a differential manner for each unit by enabling the duration and the time at which blowing is commenced or terminated to be varied according to requirements.

According to the present invention, the stepped cam is so constructed that the contour of any of the steps may be easily and conveniently varied.

In order to effect this each step of the cam is composed of any required number of slices or elements and means are provided for protruding or retracting any slice or element required, thus varying the operative contour of the step of the cam.

In other instances the stepped cam may be built up from any suitable number of sections each section including a separate slice for each step of the cam, and means are furnished for protruding or retracting any slice of any section of the cam, or again each section may be provided with interchangeable or adjustable slices so that by interchanging the slices, the requisite protrusion or retraction of any particular step can be obtained, and in some instances the section together with the slices included therein may be protruded or retracted as a whole.

In order that the invention may be clearly understood, it will now be described with reference to the accompanying drawings which show by way of example two methods of applying the same to a stepped cam for controlling the blowing valves in a machine for manufacturing hollow glass articles.

Fig. 1 is a vertical section through one of the sections of the stepped cam.

Fig. 2 is a plan of Fig. 1 with parts removed.

Fig. 3 is a similar view to Fig. 1 with the slices in a somewhat different position.

Fig. 4 is a vertical section of a modified construction in which the section of the stepped cam made up from a number of slices is adjustable as a whole.

Fig. 5 is a plan of Fig. 4 also showing the two adjacent sections.

Figure 6:
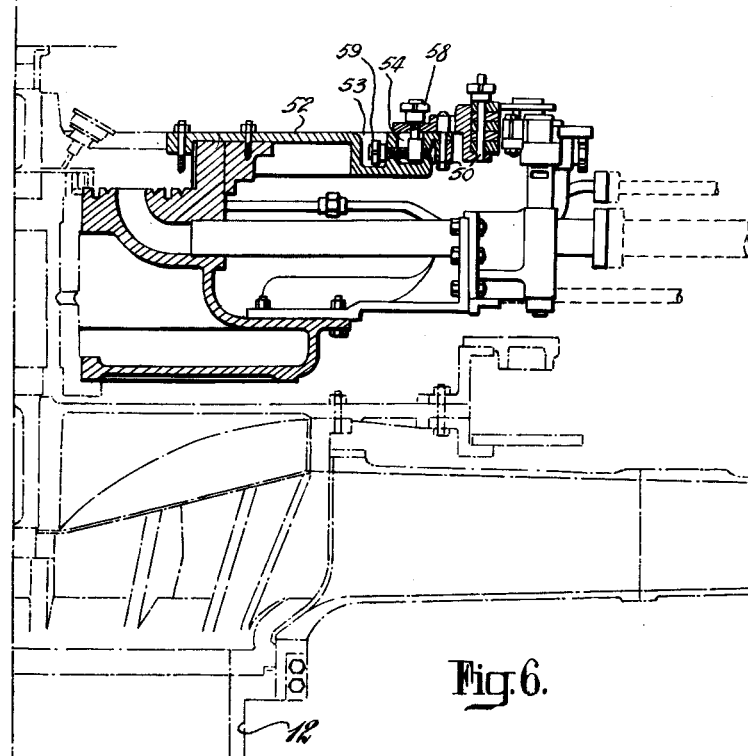
Fig. 6 is a fragmentary somewhat diagrammatic sectional elevation of the upper portion of a machine with a cam construction according to Figs. 4 and 5 adapted thereto.

Referring to Figs. 1 to 3, $a$ is a circular disc on the crown of the machine. $b$ is an angle bracket attached to the circular disc $a$ by means of a bolt $c$ and the reduced end $e$ of a stud $f$. $g$ are vertical guides extending upwardly from the horizontal portion of the angle bracket $b$. At the top these guides are adapted to have attached thereto by bolts, studs or the like (not shown) a bridge piece $h$.

The cam slices $k$ are formed by a series of plates, five being shown in the drawings, shaped as shown in plan at Fig. 2. Each of these plates has a narrow neck portion $m$ with parallel sides adapted to form a sliding fit between the guides $g$. The neck portions $m$ terminate in projections $n$ and $p$ which form stops co-operating with the guides $g$ to limit the movement of the slices. $s$ are slots in the slices which work over the stud $f$, and $t$ is the actual surface forming the contour of the cam.

At the other end of each of the slices a T shaped slot $u$ is formed, and in the enlarged portion thereof the cheese head $v$ of a screw $w$ is located. This screw $w$ screws through a tapped bore 2 in the vertical portion of the angle bracket $b$ and terminates in a squared end 3.

The slices $k$ are of such thickness that when the parts are assembled together as shown in Figs. 1 and 3 a slight clearance is left between the underside of the bridge piece $h$ and the upper surface of the uppermost slice $k$. 4 is a clamping nut screwed on to the upper end of the stud $f$.

If desired the neck portion $m$ of the slices between the guides $g$ and the stops $p$ may be formed with a number of notches or grooves 5 to co-operate with the edges or corners of the guides $g$ and act as indicators to show the amount of protrusion of the slices.

With this construction in order to adjust the amount of protrusion of any particular slice in any section of the cam, it is only necessary to slacken the clamping nut 4 and then to adjust the particular slice in question by turning the squared end 3 of the associated screw $w$ in the appropriate direction in order to draw in or push out the slice, and then after the requisite adjustment has been effected again to tighten the nut 4.

In Fig. 1 all the slices are shown fully protruded. In Fig. 3 the uppermost and lowermost slices are shown fully protruded, the second and fourth slices are shown fully retracted whilst the middle slice is shown in a middle position between the two extremes.

Referring now to Figs. 4 and 5 each of the sections is composed of any desired number of separate slices 49, adapted to be bolted together after arrangement in any desired order. In this construction, the separate slices 49 constituting the segment are mounted and secured upon a pin 50 which is itself carried by a radially slidable bracket 51. 52 is a disc formed with two circular channels 53 and 54 and provided at the crown of the machine (at the top of the fixed central column 12) for carrying the sections of the cam.

Radial adjustment of each section is effected by means of a screw threaded rod 55 which is rotatable but not longitudinally movable. This rod passes through a nut 56 in connection with the radially movable bracket 51 and located in the outer channel 54, the nut 56 coming at the end of a threaded pin 57, passing through the bracket 51 and adapted to clamp the bracket in any set position by means of a nut 58 screwing on the outer end thereof. The first mentioned screw threaded rod 55 is operated by means of a nut fixed thereon and forming a rotatable head 59 in the inner one of the before mentioned channels 53. In order to guide the radially movable bracket 51 it is formed with a radial slot 60 embracing the guide pin 61 fixed to the channelled disc 52.

With this arrangement, it will be seen that any one of the cam segments can be protruded or retracted and locked in position after setting and this may be effected even while the machine is in operation. By suitably mounting the slices 49 upon the corresponding pins 50, different cam contours may be provided.

With constructions such as those more particularly described in connection with Figs. 1 to 3 and 4 and 5, any desired number of cam segments may be provided around the head of the machine in accordance with the fineness of adjustment desired, for instance, in a typical case 72 such segments may be furnished. From the foregoing it will be observed that each step of the cam includes a plurality of individual slices, and that the slices of the respective steps are arranged in a plurality of series of superposed slices, all of which slices are movable, either individually or as a unit, with respect to the support for adjustments relative thereto.

Figure 7:
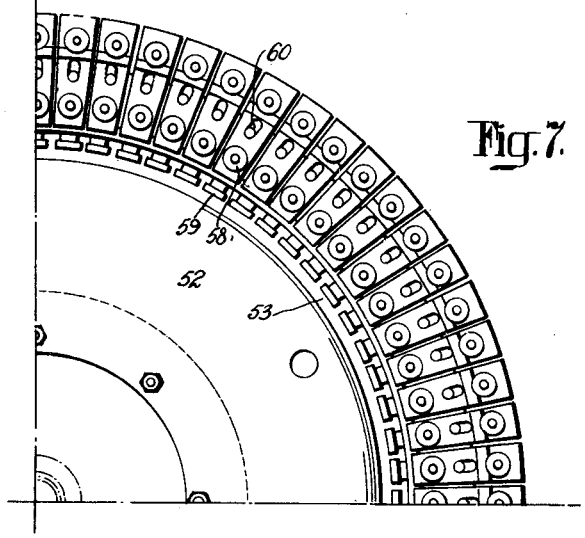
Fig. 7 is a plan of Fig. 6.

Figs. 6 and 7 show methods of arranging cam sections of the type more particularly described with reference to Figs. 4 and 5.

With this construction the individual slices can be interchanged in any section and the whole section can be more or less protruded to suit requirements, whilst in the construction described with reference to Figs. 1 to 3 each slice in a section is adapted to be independently protruded or retracted to suit requirements.

It will of course be understood that the follower rollers from which devices in connection with any of the units are operated, are so mounted and arranged that they can be adjusted to co-operate with any slice or step of the stepped cam.

Having now particularly described and ascertained the nature of my said invention and in what manner the same is to be performed, I declare that what I claim is:—

1. In a rotary machine for the manufacture of glass articles, the combination of a fixed central column, a framework carrying glass article forming units rotatable about the said central column, a plurality of vertical guides at the top of the column, slices constituting stepped cam sections and adapted to be slidden radially between said guides, each step of said cam being adapted to cooperate with a follower actuating some device in connection with one of the glass article forming units and each step being composed of any required number of slices the outer peripheries of which constitute the contour of the cam, screw means cooperating with a fixed part at the top of the column for mechanically protruding or retracting any slice radially, said screw means being operable from the top of the column while the machine is in motion, and means for locking said slices in their adjusted positions for the purposes set forth.

2. In a rotary machine for the manufacture of glass articles, the combination of a fixed central column, a framework carrying glass article forming units rotatable about the said central column, a stepped cam at the outer periphery and near the top of the column, each step of which cam is adapted to co-operate with a follower actuating some device in connection with one of the glass article forming units, each such step being composed of any required number of contiguous slices the outer surfaces of which constitute the operative contour of the cam, means for allowing each slice to be independently protruded or retracted radially, means operable from the top of the column, without stopping the machine for protruding or retracting each of said slices, and means for locking the slice in its adjusted position all for the purposes set forth.

3. In a rotary machine for the manufacture of glass articles having the features claimed in claim 1, a construction including vertical guides at the top of the column, slices constituting cam sections adapted to be slidden radially between such guides, screw means co-operating with a fixed part at the top of the column for enabling any slice to be protruded or retracted, and means for locking the slices in adjusted positions, the adjusting and locking means being operable from the top of the column whilst the machine is in motion substantially as described.

4. In a rotary machine for the manufacture of glass articles, a construction including the features claimed in claim 1, and wherein vertical guides are provided at the top of the fixed column, the plates constituting the steps of the cam being slidable radially between the said vertical guides, and wherein the means for protruding and retracting each plate comprises a fixed part on the top of the column provided with a radially extending screw threaded hole for each plate through which hole passes a screw threaded rod carrying at one end a cheese head engaging in a T shaped slot at the inner end of the plate, the said rod being furnished at the other end with means for enabling the same to be rotated substantially as set forth.

In witness whereof I affix my signature.

SYDNEY HUNT.